United States Patent [19]

Azzaroni

[11] 4,354,336
[45] Oct. 19, 1982

[54] AUTOMATIC MACHINE FOR LOADING AND UNLOADING FILMS IN RADIOGRAPHY CASSETTES

[76] Inventor: Cesare Azzaroni, Via Toscana, 51, Bologna, Italy

[21] Appl. No.: 112,313

[22] Filed: Jan. 15, 1980

[51] Int. Cl.³ .............................................. B65H 1/00
[52] U.S. Cl. .................................. 53/505; 53/266 R; 53/382; 271/9; 414/411
[58] Field of Search ............... 414/403, 404, 411, 416; 250/468; 271/9; 53/244, 377, 505, 266, 382

[56] References Cited

U.S. PATENT DOCUMENTS

| | | | |
|---|---|---|---|
| 3,150,263 | 9/1964 | Catlin | 250/468 |
| 3,628,840 | 12/1971 | Wenthe et al. | 250/468 |
| 3,888,587 | 6/1975 | Perl | 414/411 X |
| 4,049,142 | 9/1977 | Azzaroni | 414/403 X |

*Primary Examiner*—Robert W. Saifer

*Attorney, Agent, or Firm*—Browdy and Neimark

[57] ABSTRACT

An apparatus provides a magazine (83) for different film formats to reload a radiographic cassette (5), arranged alongside a conveyor (10) of said cassette on the side facing that in which a cassette opening device (34) is arranged. The magazine comprises various film-holding cassettes (109) at different levels, supported by a plate (113), sliding on vertical slides and equipped with a stylus (123), which operates, in succession, a series of level signalling microswitches (121), which, in relation to the format of the cassette (5) detected by devices (31) and (32), makes it possible to have the cassette (109) containing the film (137) of appropriate format moved to a position corresponding to a drive device (80–81) which transfers the film sheets individually into the open cassette (5). Means (34) and (36) open the cover (5c) of the cassette and means (136) detach any film (5a) which may have remain attached to the cover (5c).

12 Claims, 9 Drawing Figures

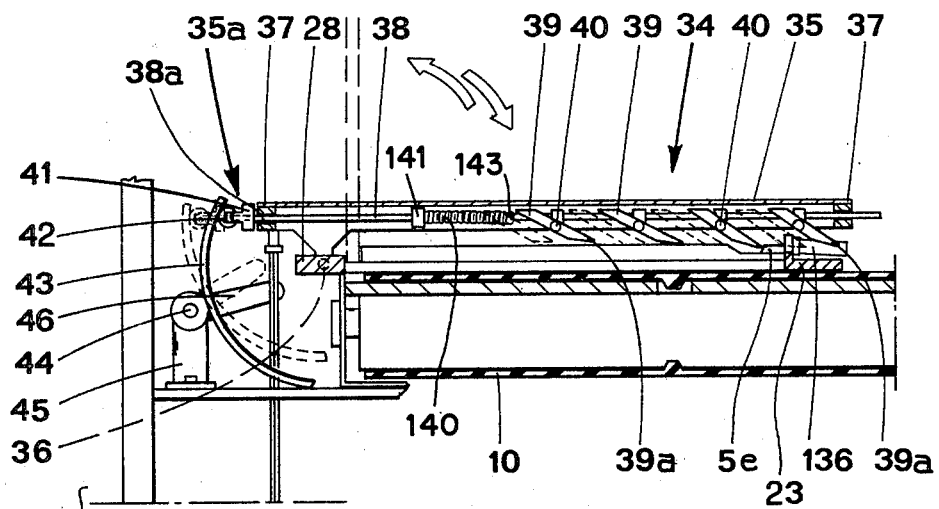
FIG 4
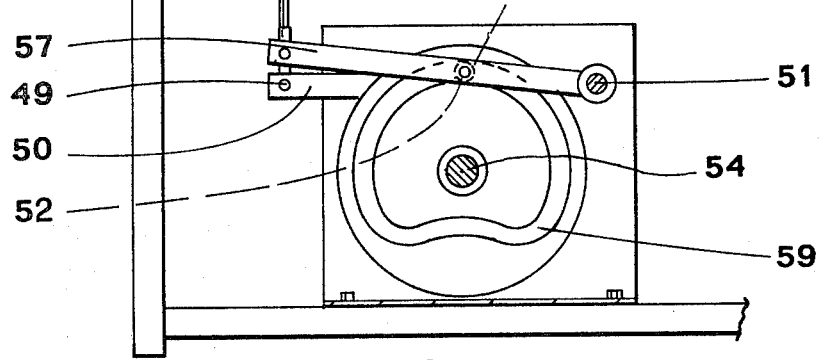
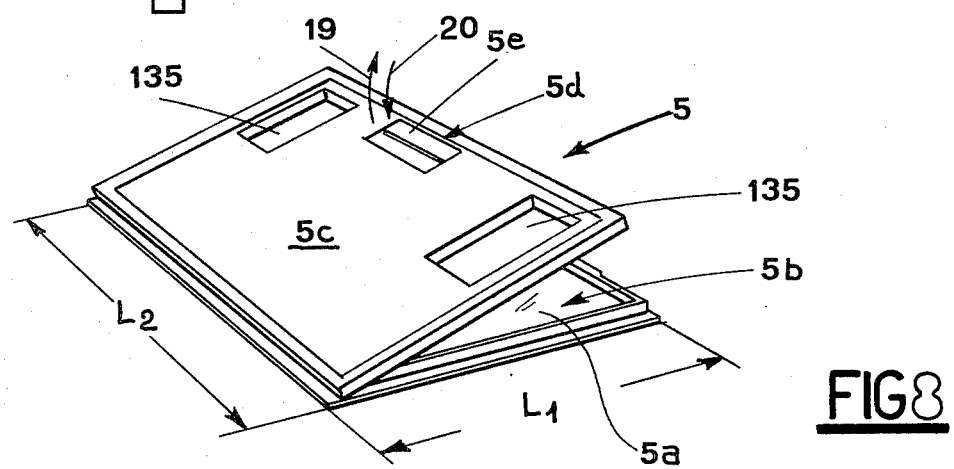
FIG 8

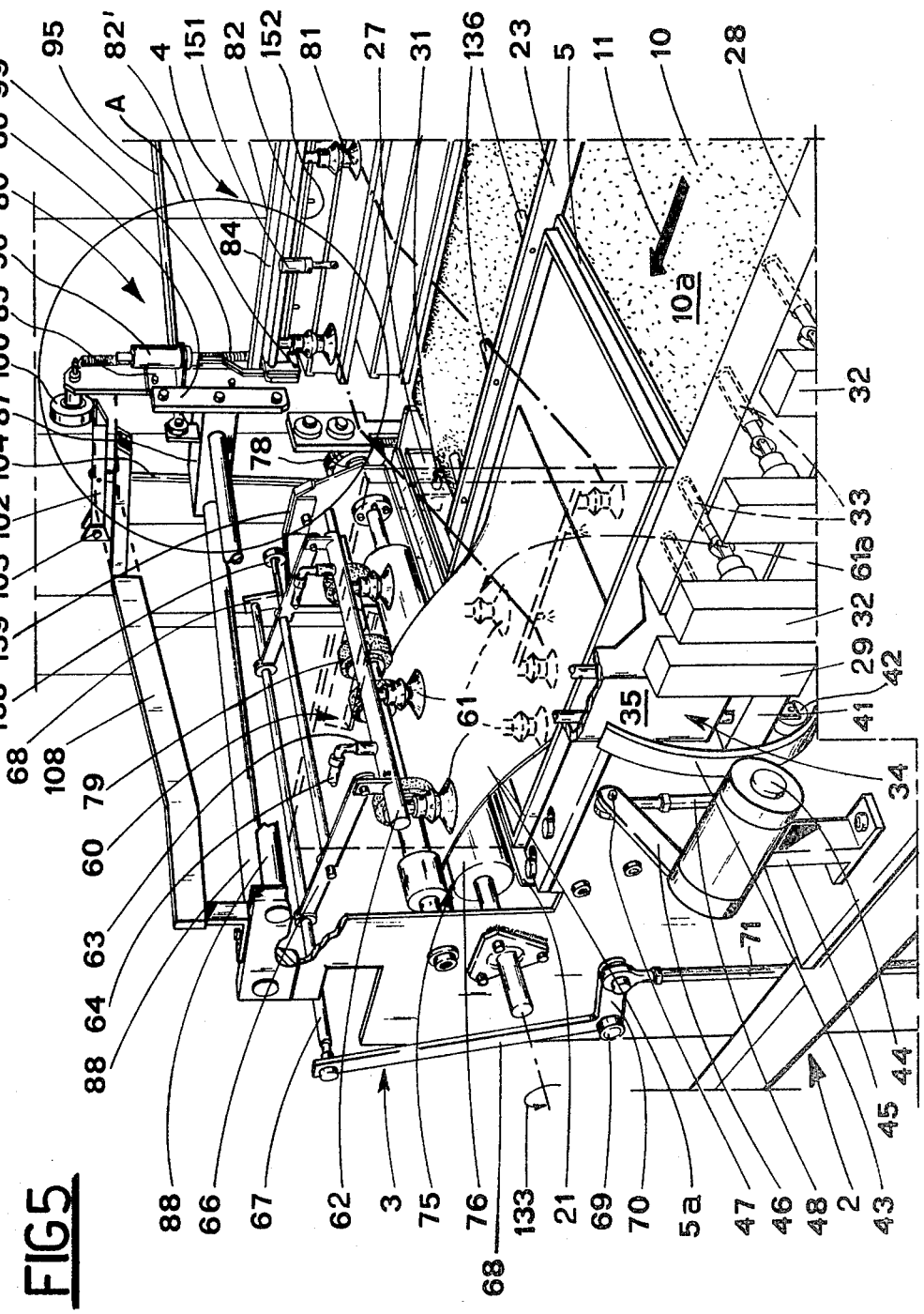

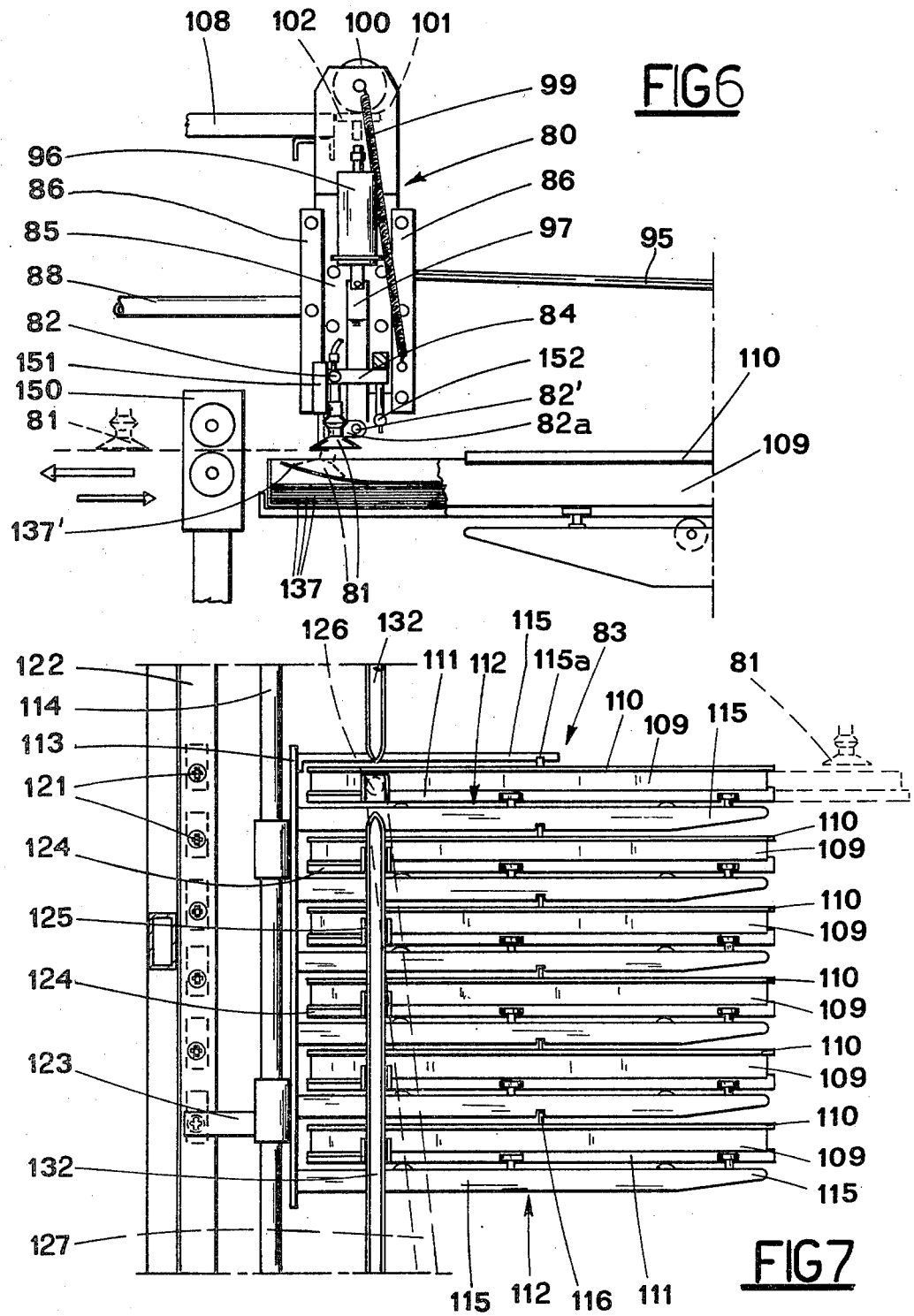

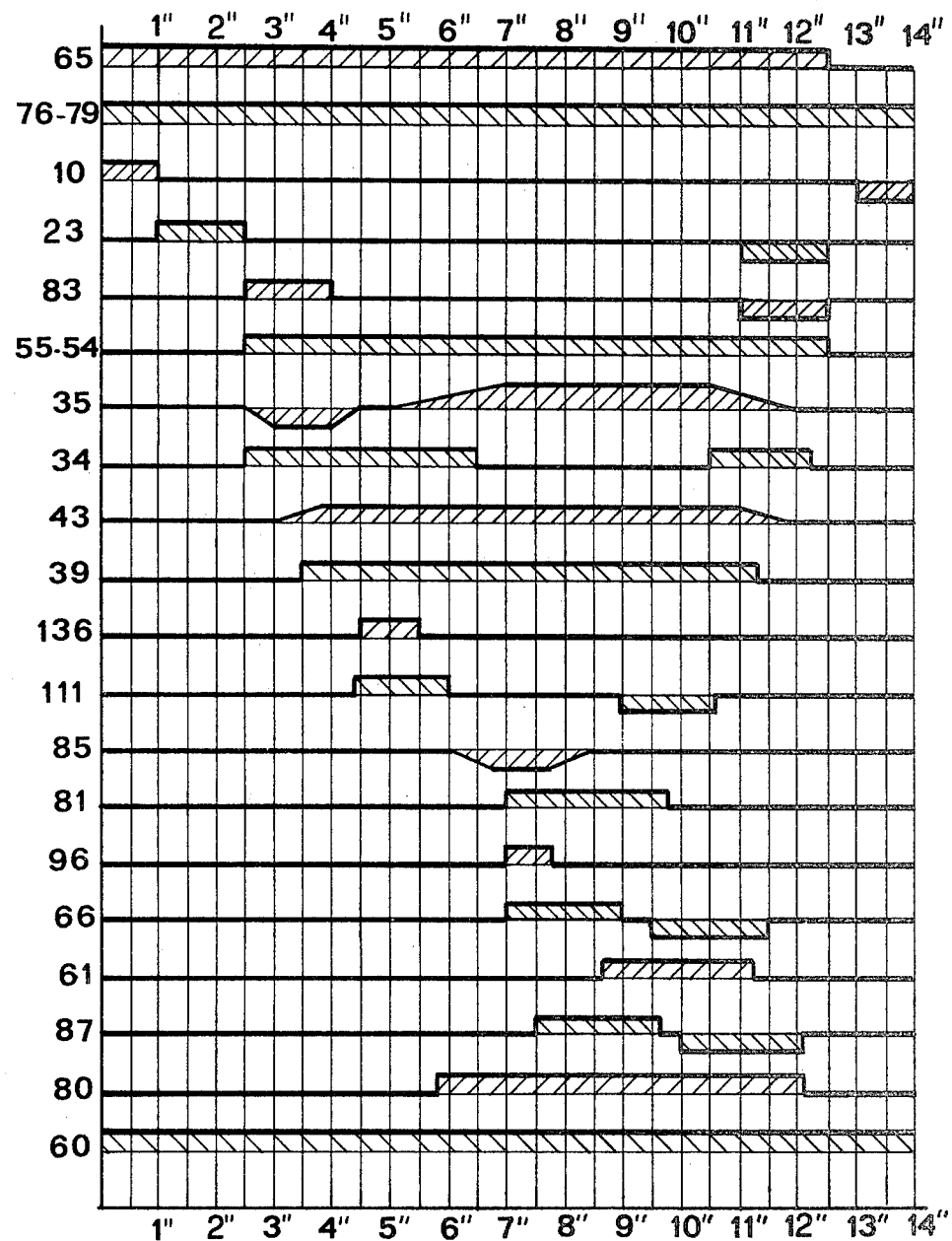

AUTOMATIC MACHINE FOR LOADING AND UNLOADING FILMS IN RADIOGRAPHY CASSETTES

BACKGROUND OF THE INVENTION

This invention concerns an automatic machine for loading and unloading films in radiography cassettes, where it is necessary to withdraw an exposed film from the cassette and to insert a new film in its stead.

Machines are at present used to carry out these operations by means of which the opening of the cassette, the withdrawal of the exposed film and transmission of same to a suitable developing apparatus, the withdrawal of a fresh film of suitable format from a suitable magazine and its insertion into the open cassette and the closing of the reloaded cassette are carried out inside the machines, in darkness and are operated by mechanical members which function in phase with one another, without entailing any direct assistance from the operator.

DESCRIPTION OF THE PRIOR ART

Normally, the known machine comprises a first station for cassette insertion in the machine, which is followed by a second station, or dark room, where special detecting members detect the dimensions of the inserted cassette, which rests, at a standstill, on suitable transportation devices. These detecting members include detecting devices which are arranged to detect, in a plane, only one cassette dimension, e.g. length, or two dimensions, length and breadth.

The magazine for films to be inserted in the cassettes inserted in the machine comprises a series of film-holder cassettes which make it possible to have different film formats available for the widest versatility in machine use. Said film-holder cassettes are arranged on different levels above that of the cassette inserted in the machine. To carry a film of desired format inside the cassette, the abovementioned detecting members control operation of the detection devices arranged in correspondence with each of said film-holder cassettes and start up only those relating to the cassette containing the films of the cassette format detected.

While the film is being withdrawn from the magazine, other operational devices, arranged in the second station, open the cassette, lift an appropriate cover thereof, withdraw the exposed film contained in the cassette and send it to the transfer devices, connected to a developing apparatus, to be developed. The film covers the entire route to reach the developing apparatus in darkness.

As mentioned, the film magazine is arranged at a level above that of the cassette inserted in the machine. To convey the films gradually withdrawn from the film-holder cassettes to the cassette inserted in the machine, known machines foresee that said withdrawal devices have associated corresponding conveying devices which send the films to appropriate collectors, the respective output openings of which are arranged corresponding to, and above, the cassette inserted in the machine, where the films fall freely inside said collectors. The film-holder cassettes are positioned in the magazine in such a way that they are always open and prearranged to permit a film to be withdrawn therefrom, or closed and able to be opened only at the moment in which a film must be withdrawn therefrom.

In a second case, the known machines are equipped in correspondence with each cassette, and with opening devices operated by the abovementioned detection devices, of the same format as the cassette inserted in the machine. Obviously, this second condition offers better guarantees of good film conservation.

On completion of cassette reloading, special devices close it immediately before, or during, its transfer outside the machine. Normally, the station in which the cassette is inserted in the machine also acts as a receiving station for the reloaded cassette.

Although machines with this structure consent a notable technical progress as compared with the times when all the abovementioned operations were carried out by an operator who had to work in a dark room, they present various drawbacks, the first being that a notable number of devices are required to open and close the film-holder cassettes and withdraw the films in the magazine from same. In fact, each cassette is equipped with an opening and closing device and a film withdrawal device, their operation depending on the format of the cassette inserted in the machine.

For all this, a notable number of control members and interconnections and connections with the abovementioned detection devices are required in the machine to obtain the desired operation. Also, with the films which, after being carried to the collectors, are conveyed to the cassette by simple free fall, it may happen that, for various reasons, they fall to reach the cassette arranged correctly, with the risk of damaging these films and adversely effecting machine operation.

SUMMARY OF THE INVENTION

The main purpose of this invention is to eliminate the abovementioned drawbacks, and, in particular, to supply an automatic machine to load and unload films in radiography cassettes, in which, once the format of the cassette inserted in the machine has been detected, by means of a single detection device, the films stored in the magazine and withdrawn from the film-holder cassette containing formats coinciding with that of the cassette, are carried directly inside the cassette and where also the magazine, controlled by said detection device, is prearranged to present the desired film-holder cassette corresponding to said detection device.

Another purpose of this invention is to supply a machine of the type indicated, where the film-holder cassettes forming the magazine, which remain closed when the machine is off, up to such time as a desired cassette reaches a point corresponding to that of the film withdrawal device, are opened, each time, by a single device, which, pushing a carriage on which the cassette rests, opens said carriage and prearranges the package of films contained in it for a film to be taken by said withdrawal device. Yet another purpose of this invention is to supply a machine of the type indicated, equipped with devices which ensure that the film already in the cassette is not withdrawn from the same in the cover lifting phase.

Another purpose of this invention is to supply a machine of the type indicated, which has an extremely simple construction, is safe to operate and cheap to produce. Said purposes are achieved by the automatic machine to load and unload films in radiography cassettes comprising: a first operation station, containing devices to insert cassettes individually in the machine and expel the reloaded cassettes from same; a second operation station, following the first, containing at least one conveying device and at least one pusher which bring the incoming cassette to contact at least one striker device with associated cassette format detection device, a device to open the cassette, the opening device positioned alongside and above said conveying device, and devices to withdraw the film from the open cassette and transfer it to the transfer devices which send it to a developing apparatus; a third operation station in which said transfer devices are positioned, and a fourth operation station containing a magazine to hold different film formats, characterized by the fact that said fourth operation station is positioned alongside the second operation station, with said magazine alongside said radiography cassette conveying device, opposite the device which opens the cassette, said magazine comprised of a series of identical film-holder cassettes positioned at different levels, on top of one another, each resting on a particular carriage, sliding, reciprocally, in the direction of the second operation station, and having the same number of frames as film holder cassettes supported by a supporting plate located behind said frame, sliding vertically and reciprocally on slides fixed to the machine frame; said supporting plate equipped with a stylus element on the line joining the actuators of a series of level signalling microswitches, one on top of the other, spaced apart by the same distance as the surfaces on which said cassettes rest on their carriages. These microswitches are inserted in the input circuit of a geared motor, through which upward then downward movement of the abovementioned supporting plate, and therefore of the whole mechanism, is achieved, together with the devices detecting the format of the cassette inserted in the machine, to lock the upward magazine movement when said stylus reaches the position where it intercepts the actuator of the level signalling microswitch relating to the cassette containing films of suitable format for that detected by the radiography cassette. The above described structure positions said cassette in correspondence with a device to withdraw a film therefrom and to transfer the film inside said cassette. The device to withdraw is arranged alongside said device conveying the cassette from the magazine, operating above said conveying device.

The carriages on which the film-holder cassettes rest, forming the magazine, are laterally equipped with corresponding coupling elements, which slide into and are engaged in a vertical slide positioned alongside the magazine, interrupted in the intermediate section at a height corresponding to that of said device to withdraw the film from the cassette and transfer it to the radiography cassette. Said intermediate section area contains a device which is engaged in the coupling element relating to the carriage carrying the film-holder cassette to a position corresponding to the device for withdrawing a film from it and for the successive transfer of same inside the radiography cassette. When the magazine is at a standstill, said device is mobile, moving either in the direction of the second operation station to move the carriage concerned from a completely rear position, with the particular film-holder cassette resting on it closed, to a position in which it brings said cassette, open, below said devices to withdraw a film, then transferring the film inside a radiography cassette and thus back to the initial position.

The pusher which brings the cassette to contact a striker element, and associated format detecting device, arranged alongside said radiography cassette conveying device on the side opposite that in which the device opening the same cassette operates, is equipped with at least one inner probe, positioned for insertion below the cover closing the cassette in its initial opening phase to detach the film in the cassette and accidentally adhering to same, from said cover. The machine with the abovementioned structure in this invention offers the advantage of an extremely simple construction, due to the limited number of operational devices required for its operation and also that, thanks to the solution which permits direct, controlled transfer of the films from the magazine in the cassette inserted in the machine, it ensures perfect operation in addition to a significant reduction in the operative times required for each complete operational cycle, with the consequent advantage that it is cheaper to run than known machines.

BRIEF DESCRIPTION OF THE DRAWINGS

The characteristics of the machine invented will now be illustrated in the following description of a preferred form of production, referring to the enclosed drawings in which:

FIG. 4 is a schematic diagram showing a side view of the detail of the abovementioned machine, i.e. the device which opens and lifts the cassette cover;

FIG. 5 is a schematic, perspective view of the device to withdraw films from the cassette and the device to withdraw films from the magazine;

FIG. 6 shows a front, enlarged view of the detail A in FIG. 5;

FIG. 7 is a schematic diagram of the film magazine and a side view of the device to open the relevant cassettes, viewed from the opposite part to that illustrated in FIG. 1, with cutaway sections;

FIG. 8 is a perspective view of a new type of radiography cassette which may be unloaded and reloaded by the abovementioned machine; and FIG. 9 is a schematic diagram of the operational phasing of the devices operating the machine, referring to a complete cassette unloading and reloading cycle.

DESCRIPTION OF THE PREFERRED EMBODIMENT

Figure 1:
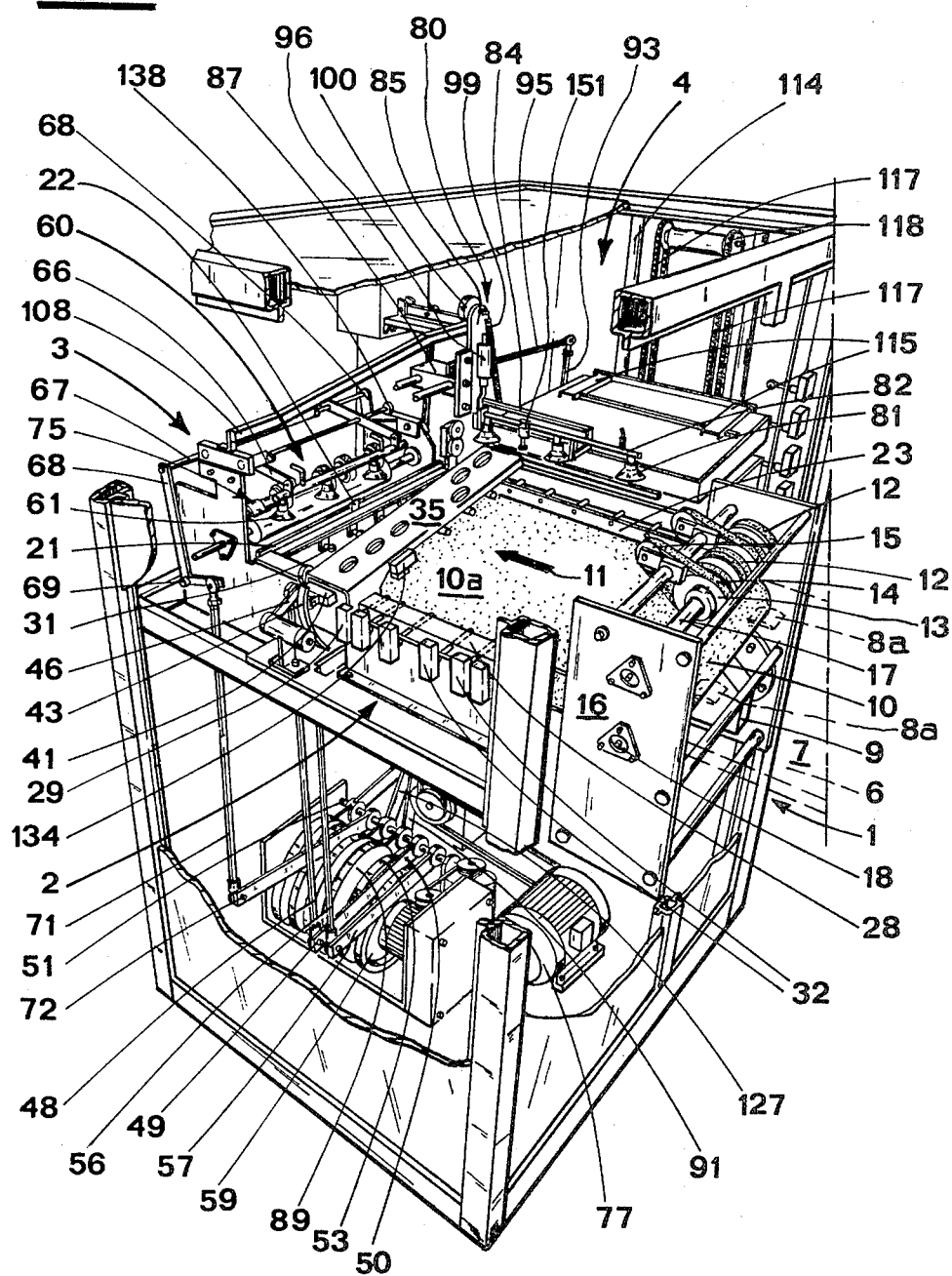
FIG. 1 is a schematic diagram of the abovementioned machine, showing a perspective view of the part in which the cassette is inserted or withdrawn, with cutaway sections to enhance the others.
Figure 2:
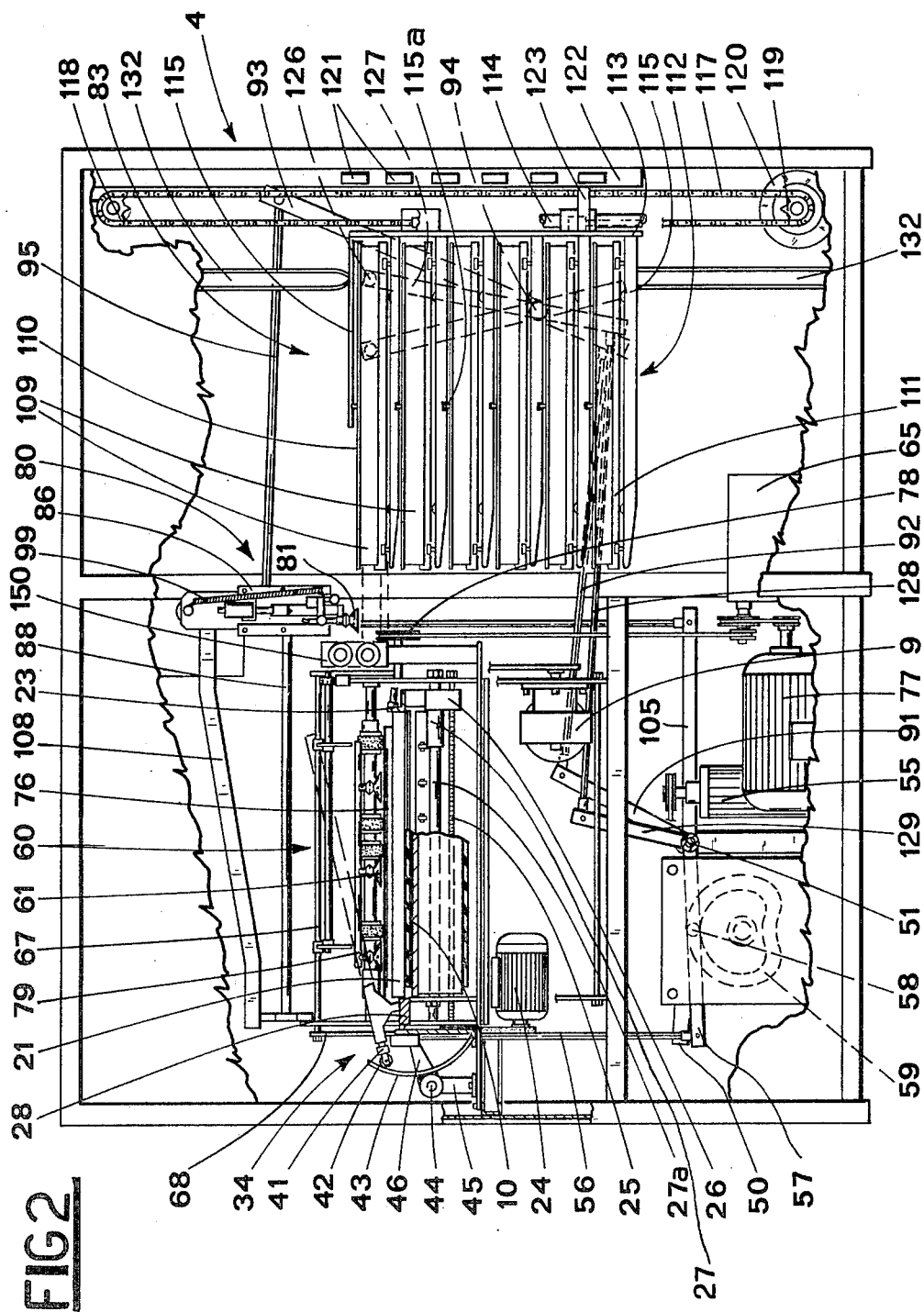
FIG. 2 is a schematic diagram showing the front view of the abovementioned machine with cutaway sections.

In these figures, in particular FIGS. 1 and 2, the abovementioned machine is mainly composed of the following operation stations:

a first operation station 1 to insert the radiography cassette in the machine and receive the same cassette, reloaded, from the machine;

a second operation station 2, positioned to follow the first, according to the forward direction of the cassette 5 entering the machine, where, as we will see later, the cassette with the exposed film is withdrawn and reloaded with a new film taken from a magazine;

a third station 3, positioned to follow the second station 2, where the conveying devices transfer the films unloaded from the cassette to a developing apparatus;

and a fourth station 4, positioned alongside the second station, where the machine magazine is located. Stations 2, 3 and 4 are all shielded from the light to avoid film alteration.

In the first operation station 1, a loading level 6 is provided with a supporting surface 7 for insertion of the cassette 5, containing the exposed film 5a, in the machine and receive the same cassette reloaded. The actuators 8a of one or more microswitches 8 are positioned in correspondence with the loading level 6, and, intercepted by the cassette 5, and pushed towards the second station 2, they control starting of a geared motor unit 9 operating a conveyor belt 10, which is developed towards and inside the second station 2.

The continuous conveyor belt 10, as will be explained more fully later, is motorized in the insertion phase of cassette 5 in the second station 2 so that the upper conveying surface 10 moves in the direction of the arrow 11, while, in the expulsion phase of the reloaded cassette 5, it moves in the opposite direction from the machine.

The number 12 indicates a series of soft rubber rollers with cylindrical surfaces. Said rollers 12 are positioned to correspond to the first station 1, above the continuous conveyor belt 10, and to cooperate with it in inserting and expelling the cassette 5 in and from the second station 2.

Rollers 12 are supported by corresponding pulleys 13 on which belts 14 are partially wound. The belts 14 are also partially wound on tension pulleys 15 supported by a frame 16 fixed to the base frame of the machine. The pulleys 13 are keyed to a shaft 17 supported by the frame 16. The frame 16 also supports a shaft 18 which drives the continuous conveyor belt 10.

In the expulsion phase of the cassette 5 from the second station 2, the pulleys 14 and rollers 12 function, as will be seen later, as a closing device for the same cassette. Before proceeding with the description of the machine and the purposes, to facilitate the description and function of the operating members in the second station 2, a brief description will now be given of a known type of radiography cassette suitable to be unloaded and reloaded by the above-mentioned machine.

The cassette 5 is of the type with an internal space 5b, in which the radiography film 5a is positioned, closed by a cover 5c hinged along one side of the cassette, equipped on the opposite side with a locking mechanism 5d to open and close the cassette 5, operated by a trigger 5e flag-jointed to the cover 5c, moving in the two directions indicated by the arrows 19 and 20. To open the cassette 5, the trigger 5e must be turned in the direction of the arrow 19 until the cover 5c is loosened, then this cover lifted and turned around the hinging axis to the cassette 5.

The abovementioned machine provides a first striker 21 in said station 2 in corresponding position to the rear end of the continuous conveyor belt 10 to receive the incoming contacting cassette 5. Near the striker 21 a microswitch is also provided, which controls stopping of the geared motor unit 9 and therefore of the continuous conveyor belt 10, when the cassette 5 contacts the striker 21. The number 23 indicates a pushing device positioned alongside and above the continuous conveyor belt 10 in the area connecting the second and third operation stations 2 and 3 of the machine. The purpose of the pusher 23 is to bring the cassette 5, contacting striker 21, to a position where it is subject to the action of format detection devices and devices to open the cover 5c, which will be described later.

Figure 3:
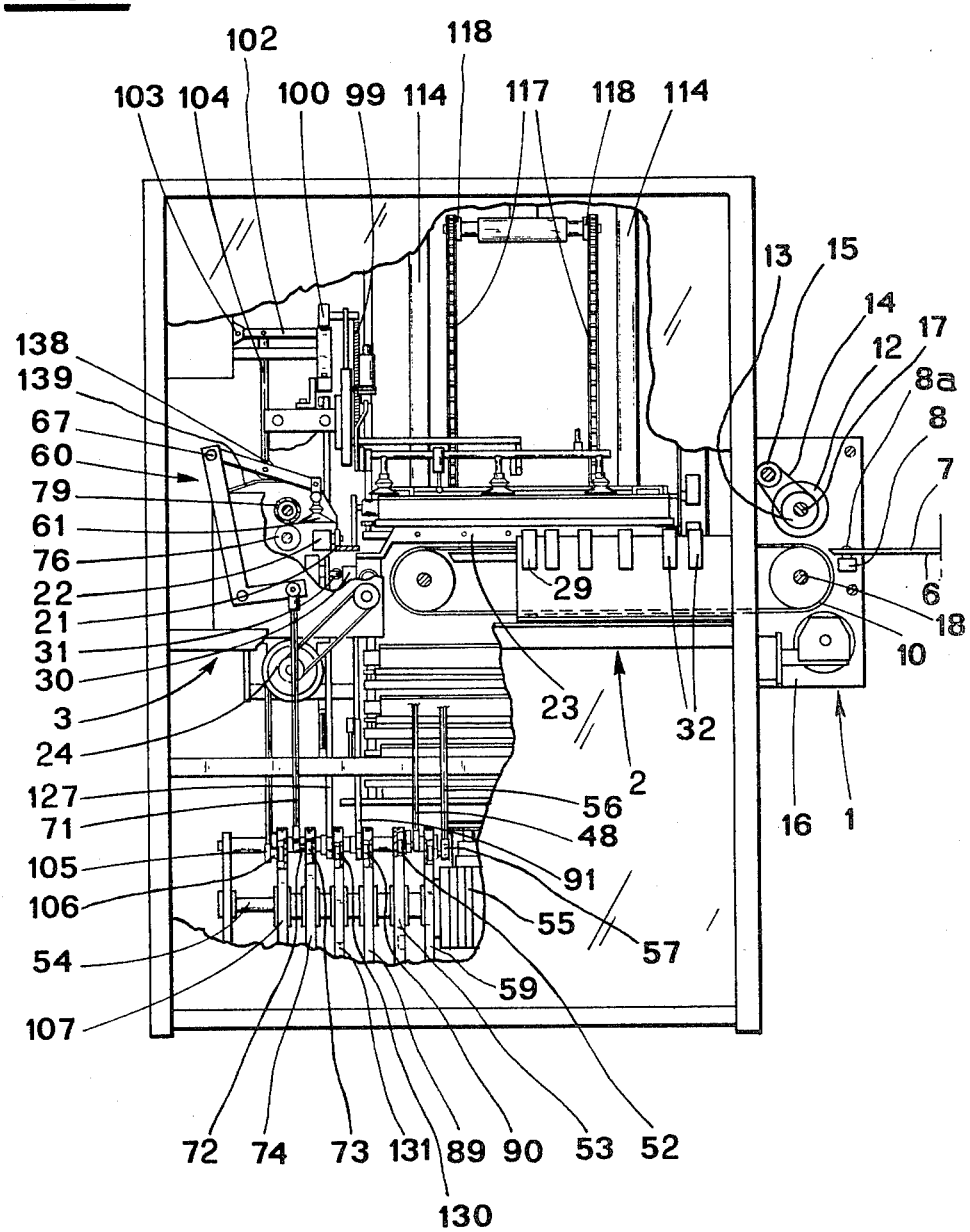
FIG. 3 is a schematic diagram showing a side view of the abovementioned machine from the side opposite the one in which the film magazine is arranged.

The pusher 23 is operated in such a way that it moves reciprocally, transversly and above the continuous conveyor belt 10. It is operated by a motor 24, see FIGS. 2 and 3, kinematically connected to a screw 25 rotatably supported by the machine frame. The screw 25 engages a threaded bush 26 fixed to a support 27 sliding on slides along a shaft 27a parallel to the screw 25, also supported by the machine frame. The pusher 23 is associated with said support 27. Depending on the direction in which the screw 25 of the motor 24 rotates, the pusher 23 will be translated in one direction or the other, transversally and above the continuous conveyor belt 10.

In its outward run, which corresponds to a translation from right to left observing FIG. 2, the pusher 23 causes the cassette 5, already against striker 21, to contact a second striker 28 arranged alongside the continuous conveyor belt 10 on the side opposite that from which the pusher starts. A microswitch 29, inserted in the feed circuit of the motor 24, is arranged to correspond to the striker 28. When the cassette contacts the striker 28, the microswitch 29 stops the motor 24 and therefore also the pusher 23. The abovementioned machine is preset to detect the format of the cassette 5 inserted in the second station 2 by measuring its breadth and length, indicated in FIG. 8 as $L_1$ and $L_2$. The breadth $L_1$ is measured during the outward run of the pusher 23 by means of a stylus 30 associated with the support 27, which intercepts, at successive times, a series of microswitches 31, arranged in consecutive lines in correspondence with the second striker 28, its actuators being subject to the action of respective actuators 33 passing through the striker 28, positioned for interception by the cassette 5 when this contacts the same striker 28. The microswitches 31 and 32, intercepted by the stylus 30 and the cassette 5 respectively, detect the format of said cassette 5, and, as will be explained more fully later, preset the machine magazine to supply a new film of suitable format for said cassettte.

A description will now be given of the device shown in FIGS. 1, 2, 3, 4 and 8, which opens the cassette 5 when it contacts the strikers 21 and 28. This device is always indicated with the number 34 and comprises an arm 35, articulated in 36 to the machine frame, equipped at its ends with supports 27 to support, in a smooth-running way, a pair of rods 38. Each rod 38 supports a series of coupling elements 39, arranged consecutively, suitably spaced to form couples on the same line.

The coupling elements 39 are balance-jointed in 40 to the rods 38 to rotate around the respective joint pins and to result flexibly with their front end 39a facing downwards. To ensure that the coupling elements 39 are in the same position, their rear ends are in contact with the inner surface of the upper wall of the arm 35 so that they are capable of working on cassettes 5 with different breadths $L_1$ and lengths $L_2$.

The rods 38 are interconnected to correspond to the rear ends 38a, by means of a strip 41, forming a rear projecting support to a pin 42, engaging a curved slide 43. The slide 43 is fixed to the end of a pin 44 with axis normal to the axis of the rods 38, revolvingly supported by a support 45 fixed to the machine frame. At the other end of the pin 44, an arm is fixed to the end of a tie-rod 48 primed in 47, the other end being articulated in 49 to the free end of a lever 50 pivoted on a shaft 41, supported by the machine frame and carrying a pin 52, engaged in the shaped race of a cam 53. The cam 53 is keyed on a shaft 54, started by a geared motor 55, also supported by the machine frame. The curved race 43 is arranged in such a way that, as will be seen later, when the tie-rod 48, activated by the cam 53, causes the arm 46 to rotate downwards, it comes to rest on a curved trajectory with center in the point 36, articulating the arm 35 to the machine frame, causing a relevant forward translation of the rods 38 with respect to the arm 35.

The purpose of the coupling elements 39 is to operate the trigger 5a, which frees the locking mechanism 5d of the cassette closing cover 5c to allow said cover 5c to be lifted. To lift same, the rear end 35a of the arm 35 engages the tie-rod 56, to the lower free end of a lever 57 pivoted on the shaft 51.

The lever 57 carries a pin 58, engaged in the shaped race of a cam 59 keyed on the shaft 54. The race of the cam 59 is shaped in such a way that the arm travels, at suitable times, from the position illustrated by the continuous line in FIG. 4 to that illustrated by the broken line in the same FIG. 4, to then return to the initial position. A description will now be given of the device shown in FIGS. 1, 2, 3 and 5, which withdraws the film from the open cassette 5 and sends said film to a developing apparatus, not shown in the enclosed drawings.

Said withdrawal device, indicated by the number 60, provided in the third operation station 3, operates above the continuous conveyor belt 10 and comprises a series of feeding suckers 61, associated with a tubular cross member connected to a suction apparatus 65 by means of pipe connections 63-64 (see FIG. 2). The feeding suckers 61 are suitably spaced and are provided in sufficient number to succeed in withdrawing different film formats. The feeding suckers 61 will be positioned taking into account the length of the various films.

The cross member 61 is supported by a frame 66, the rear cross member being bilaterally connected to the free end of a pair of arms 68, which form the same number of levers pivoted in 69 to the machine frame. One of said levers (see FIG. 3) is squared and one of the ends of the tie-rod 71 is connected to the arm 70, positioned at an angle to the arm 68, the other end, shown in FIGS. 1, 2 and 3, being articulated to the free end of a lever 72 pivoted on the shaft 51. The lever 72 carries a pin 73, engaged in the shaped race of a cam 74 pivoted on the shaft 54. The feeding suckers are moved by the cam 74 from the position illustrated by the continuous line in FIGS. 1, 2, 3 and 5 to the position 61' indicated by the broken line in FIG. 5, in which they grasp the film 5a housed in the cassette 5 corresponds, and then return in to the initial position, with corresponding withdrawal of the film 5a from the cassette 5 and its insertion in a transfer device 75 which sends it to the developing apparatus. This is due to the fact that, by means of a pin 138, the frame rests constantly on a shaped slide 139, which makes it possible to achieve the abovementioned movements during the return run of the same frame 66. The transfer device 75 comprises a roller 76, supported by a machine frame, rotated by a geared motor 77 which also operates the suction apparatus 65, kinematically connected to the pulley 78 keyed to one shaft end in said roller, and a series of rollers 79 operating in contrast with the same roller 76. The roller 76 and the contrast rollers 79 are in soft material to avoid damaging the film 5a.

With particular reference to FIGS. 1, 5 and 6, a description will now be given of the device provided to withdraw a film from the magazine and transfer it into the cassette 5. All these devices are indicated with the number 80 and comprise a series of feeding suckers 81 supported by a cross member 82, which stretches out in front of, and near, the machine magazine, indicated with the number 83, of which more will be said later, and above the continuous conveyor belt 10.

The cross member 82 is bilaterally articulated in 82' to a frame 84 associated with a sliding block 85, which slides within a vertical slide integral to the carriage 87. The carriage 87 slides alternatively on two bars 88 supported by the base frame of the machine, developing normally in the movement direction of the continuous conveyor belt 10 above the withdrawal device 60.

The carriage 87 is started by a cam 89 keyed on the shaft 54, its shaped race being engaged in a pin 90 carried by a squared lever 91 pivoted on the shaft 51. Said squared lever 91 is connected by means of a tie-rod 92 to another lever 93 pivoted in 94 to the machine frame. The lever 93 is connected to the carriage 87 by means of a tie-rod 95. The cross member 82 is subject to the action of a small pneumatic piston 96, supported by the sliding block 85 and its shank is connected by means of a rod 97 to an arm of lever 82a (see FIG. 6) integral to the same cross member 82. The movement of the small pneumatic piston 96 causes angular displacement in both directions of the feeding suckers 81 around articulation points 82', for reasons which will be explained together with the description of the machine function.

The sliding block 85 is subject to the action of a spring 99, which, when the device 80 is in the starting position, tends to maintain a pin 100, associated with the same sliding block 85, against a bearing 101 presented by a lever 102 pivoted in 103 to the machine frame. The lever 102 makes the downward translation of the sliding block 85 possible in suitable times to permit the feeding suckers 81 to place a film on and withdraw a film from the magazine 83 each time and then to bring everything back to the initial position with consequent withdrawal of said film from the magazine. For this purpose, the lever 102 is connected by means of a tie-rod 104 to another lever 105 pivoted on the shaft 51, carrying a pin 106 which is engaged on the shaped race of a cam 105 keyed on the shaft 54. The number 108 indicates a shaped slide developing above the bars 88 on which the pin 100 associated with the sliding block 85 slides during translation of the carriage 87 in both directions.

The slide 108 is shaped in such a way that, during the forward translation of the carriage 87, to which the transfer of the film withdrawn from the magazine 83 from said magazine to the cassette 5 corresponds, permits the gradual downward translation of the sliding block 85 to allow the feeding suckers 81 to directly support the said film inside the cassette 5.

A description will now be given of the various sections of the magazine 83 shown in FIGS. 2 and 7 for different film formats to be carried into the cassette 5, as these are gradually inserted in the machine.

The magazine 83 is positioned in the fourth operation station 4 and consists in a series of identical film-holder cassettes 109 arranged on different levels, one on top of the other.

Each cassette 109 is equipped with a closing cover 110 with respect to which it may slide longitudinally in both directions towards and away from the operation station 2.

Each cassette 109 rests on a carriage 111 supported by a corresponding frame 112, with the possibility of sliding guided in both directions with respect to the latter only in the direction of the second station 2 and therefore in normal direction to the movement direction of the continuous conveyor belt 10.

The frames 112 are bracket-supported by a supporting plate 113 constrained in a smooth-running way to a pair of vertical rods 114 fixed to the machine frame, each comprising a pair of parallel bars 115 which are developed above the relevant carriage 111.

Consequently, when a desired carriage 111 slides towards the second station 2, the cassette 109 will slide forward, resting on it, with respect to its cover 110, which remains engaged in the bars 115, thus opening said cassette 109. As mentioned above, the magazine 83 is suitable to contain films of different formats. For this reason, the various cassettes 109 are internally equipped with dividing elements, not shown in the diagrams, forming compartments to contain films of the required format.

A desired cassette 109 must be brought to the working height of a withdrawal device 80 in relation to the format of the cassette 5 inserted in the machine and detected by the microswitches 31 and 32.

For this purpose, a supporting plate 113 is coupled to a pair of chains 117 wound around serrated transmission teeth 118 and 119, the 118 teeth supported by the machine frame, and the 119 teeth keyed on the output shaft of a geared motor 120 fixed to the base of the machine. According to the rotation direction of the shaft of the geared motor 120, there will be an upward or downward translation of the magazine 83, with the possibility of bringing the cassette 109 containing the films of desired format to the working height of the withdrawal device 80. To stop this geared motor 120, when a desired cassette 109 reaches the working height of the withdrawal device 80, a series of level signalling microswitches 121 are provided inserted in the feed circuit of the geared motor 120, connected to the microswitches 31 and 32 which detect the cassette format.

The microswitches 121 are fixed at different levels, one on top of the other, to a vertical bar 127 parallel to the vertical rods 114.

The number of microswitches equals that of the cassettes 109 and they are spaced at a value equal to the distance between the surfaces on which the cassettes 109 rest on the carriages 111.

The microswitches 121 are also arranged in such a way that they are intercepted by a stylus 123 fixed to the supporting plate 113.

As mentioned in the introductory part of the description, it is only possible to open a desired cassette 109 when this cassette reaches the working height of the withdrawal device 80 and the machine concerned provides a single device to open all cassettes as they are carried to said position. According to the solution illustrated in FIGS. 2 and 7, on the side of each carriage 111 opposite that facing the microswitches 121, is an arm 124 to which a coupling 125 is associated with which it is free to be engaged, when a desired cassette 109 reaches the working height of the withdrawal device 80, a pin 126 primed to the upper end of a lever 127 also pivoted in 94 to the machine frame. The lever 127 is connected by means of a tie-rod 128 to one of the arms of a square lever 129 pivoted on the shaft 51 carrying, at the free end of each arm, a pin 130 which is engaged in the shaped race of a cam 131 keyed on the shaft 54. The cam 131 makes the lever 129, and therefore the lever 127, oscillate around its fulcrum and consequently the translation in one direction or the other of the carriage 111 relating to the cassette concerned, thus, as already mentioned, opening and closing the same cassette.

The number 132 indicates a vertical slide fixed to the machine frame in which the couplings 125 are constantly engaged in a smooth-running way in the carriages 111 in a rear position, i.e. with the cassettes 109 closed. The slide 132 is positioned on the same level as the pin 126 or is interrupted correspondingly to same to permit the only carriage relating to the cassette 109, carried to the working height of the withdrawal device 80, to slide in both permissible directions. Since we have described up to now all sections of the machine in this invention, we will now explain how it functions, referring to the diagram of its phases illustrated in FIG. 9. In the diagram in FIG. 9, the stopping and intervention times involved for the various devices are shown in abscissa, considering that the time involved to carry out the complete loading and unloading cycle of a cassette 5 is 14 seconds, while the movements of some organs are shown in ordinate with sloping lines.

It should also be noted that the shaft 54 on which the cams 53, 59, 74, 89, 107 and 131 are keyed, has an associated programmer not shown in the drawings, to which the motor organs of the machine are subject and which determines the times and phases of their intervention.

The following starting situation should be considered with the machine off. The geared motor 77 is at a standstill and therefore the suction apparatus 63 does not function; the roller 76 of the withdrawal device 60 is at a standstill, the geared motors 9, 55 and 120 are at a standstill and the opening device 34 is therefore in a slightly raised position, the pusher 23 and the withdrawal devices 60 and 80 are in the starting position shown in FIG. 3 and the magazine 83 in the maximum downward translation position.

When a cassette 5 is brought to rest on the loading surface 6 and pushed against the microswitches 8, the latter, intercepted, start the geared motor 9, which starts up movement of the continuous conveyor belt 10 and the geared motor 77, which operates the suction apparatus 65 and starts the roller 76 of the withdrawal device 60 rotating in the direction of the arrow 133 in FIG. 5. The cassette 5 is thus drawn from the continuous conveyor belt 10 and the rollers 12 into the second operation station 2. When the cassette 5 reaches the striker 21, it intercepts the microswitch 22 which stops the geared motor 9 and therefore the continuous conveyor belt 10 and starts the motor 24 which rotates the screw 25.

Consequently, the pusher 23 translates from right to left above the continuous conveyor belt 10, pushing the cassette 5 against the second striker 28. When the cassette 5 fouls the striker 28, the mircroswitch 29 stops the motor 24 and therefore the pusher 23, while one or more microswitches 31, intercepted by the stylus 30, and one or more microswitches 32 activated by the actuators 33 contacted by the side of the cassette 5 which contacts the striker 28, detecting the dimensions $L_1$ and $L_2$ and therefore the format of the cassette 5. The microswitch 29 also starts the geared motor 120, which, by means of the chains 177, starts making the supporting plate 113 and thus the magazine 83 translate upwards. The upward translation of the magazine 83 continues for the length of time for which the stylus 123 intercepts the microswitch 121, which, in relation to the cassette format detected by the microswitches 31 and 32, stops the geared motor 120 with the film-holder cassette 109 containing films of suitable format for that detected at the working height of the withdrawal device 80.

During this phase, the geared motor 55 starts up, causing rotation of the shaft 54 on which the cams 53, 59, 74, 89, 107 and 131 are keyed. The cam 59 provokes downward rotation of the arm 35 of the device 34 until it brings the coupling elements 39 to rest on the cover 5c. In this phase, considering the type of cassette 5 illustrated, a microswitch 134 (see FIG. 1) fixed to the arm 35 checks that the cassette 5 has been correctly inserted in the machine. The cover 5c presents a sinking 135 (see FIG. 8), which, if the cassette 5 is incorrectly inserted in the machine, creates a vacuum below the microswitch 134 and blocks its operation. In this case, the microswitch 134 stops the machine's operational cycle; the geared motor 29 is activated and starts the continuous conveyor belt 10 moving in the opposite direction to the previous one and the cassette 5, still closed, is expelled from the machine.

If, on the contrary, the microswitch 134 is stressed, the operational cycle proceeds regularly.

The cam 53 causes the curved race 43 to rotate in clockwise direction around the pin 44, see FIG. 4. In this way, due to the action of the race 43 on the pin 42, the rods 38 are pushed forward so that the coupling element 39, suitable to move the trigger 5e operating the locking device 5d of the cassette inserted, make said trigger rotate in upward direction, working iys way below it, consequently opening the cassette 5.

At this point, the cam 59 causes initial upward rotation of the arm 35 so that the cover 5e is slightly raised; this rotation is followed by a brief pause and there is then a further rotation until the cassette is completely open with the cover 5c practically in vertical position. During said pause, a series of probes 136, suitably pneumatically controlled and associated with the pusher 23, see FIGS. 2 and 5, work their way below the cover 5c and avoid the film 5a following this cover during cassette opening and keep it correctly positioned inside the cassette itself. During the opening phase of the cassette 5, the cam 131 provokes forward translation of the carriage 111 on which the cassette 109 rests, which has been chosen, as seen, in relation to the previous factors detected by the microswitches 131 and 132.

The cassette 109 in question is thus opened and the package of films 137 is brought below and near the feeding suckers 81 of the withdrawal device 80. At this point, the cam 107 causes the lever 102 to move at a downward angle, with a corresponding downward run of the sliding block 85 until the feeding suckers 81 have adhered to the first film 137' of the package of films 137.

The feeding suckers 81 are activated at the same time as the small pneumatic piston 96, the shank of which, sliding downwards, causes the cross member 82 to rotate around the articulation points 82' so that the feeding suckers 81, sloping, detach the front edge of the film 137' adhering to them from the underlying film package 137. Immediately afterwards, the lever 102 returns to the initial position and the sliding block 85 thus translates upwards, drawing with it the feeding suckers 81 and the film 137' adhering to them. While this phase is taking place, the small pneumatic piston 96 stops working and the cam 74 provokes a forward run of the frame 66 of the withdrawal device 60 to which the feeding suckers 61 are associated.

During this run, due to the fact that the pin 138 constantly follows the shaped slide 139, the frame 66 is initially displaced and therefore the feeding suckers 61 displaced below the cassette 5, followed by their sinking to the position 61a in FIG. 5 in contact with the film 5a. At this point, the feeding suckers 61 are linked to the suction apparatus 65 and adhere firmly to the film 5a. Immediately afterwards, the cam 74 makes the frame 66 gradually regain its initial position, to which the direct transfer of the film 5a withdrawn from the cassette 5 between the rollers 76 and 79 corresponds (FIG. 5). In the meantime, the cam 89 provokes a forward run of the carriage 87 on the bars 88, with corresponding transfer, by the withdrawal device 80, of the film 137', withdrawn from the cassette 109 in question from the magazine 83 to the opened cassette 5. Before the new film reaches the cassette 5, or at any rate when the frame 66 reaches the starting position, the feeding suckers 61 are deactivated and the film 5a, withdrawn from the cassette 5, is sent to the developing apparatus by the rollers 76 and 79.

When the carriage 87 reaches the maximum forward run position, the feeding suckers 81 are deactivated and the new film 137' is left already correctly arranged inside the cassette 5.

Before continuing the description of the machine's function, it must be noted that a device 150 is provided (see FIGS. 2 and 6) through which the film 137' being transferred inside the cassette passes. This device controls operation to assure that the feeding suckers 81 have not accidentally withdrawn extra films from the cassette 109 in question.

If the device 150 detects the abovementioned mistake, it signals the fact to the operator, who, when the cassette 5 comes out of the machine, arranges to recover one or more excess films. Furthermore, the device 80 foresees both a stylus device 151 to detect the absence of films in the cassette 109 considered of the magazine 83 and to signal their absence to the operator, and a series of nozzles on a tubular bar 152 positioned near the feeding suckers 81 through which, at the moment the film 137 is abandoned by said feeding suckers 81, jets of air are blown on the film to detach it from the feeding suckers 81 and insert it stably in the cassette 5. While the carriage 87, and therefore the withdrawal device 80, controlled by the cam 89, return to their initial position, the cam 59 controls downward rotation of the arm 35 and therefore the gradual sinking of the cover 5c to the closing position of the cassette 5. When the cover 5c reaches a position near the closing one, with the arm 35 in the starting position, the cam 53 starts the curved slide 43 rotating around the pin 44 in the opposite direction to the previous one. Consequently, due to the action of at least one spring 140, coaxial to each rod 38 and contacting a fixed striker 141 integral to the arm 35 and a relevant contacting ring 143 fixed to the rods 38, the axes themselves slide back from the arm 35 and the coupling element 39, which engaged the trigger 5e of the locking device 5d of the cover 5c of the cassette, is brought to a position in which said trigger is freed. The cover 5c therefore falls freely resting on the cassette 5. All these phases take place during a complete turn of the shaft 54 on which the cams 53, 59, 74, 89, 107 and 131 are keyed.

At the end of this rotation, all the organs operating the machine, including the magazine 83, will have returned to the starting position and the geared motor 9 is started, which starts the continuous conveyor belt 10 moving so that the conveying surface 10a draws the cassette 5 outside the machine. In this phase, firstly by means of the belts 14 and then by means of the rollers 12, operating in contrast with the conveyor belt 10 on the locking device 5d, the cover 5c is released in the closing position of the cassette 5, which leaves the machine ready for a new use.

Obviously, the invention is not limited to the particular shapes described and illustrated, and it is therefore understood that variations may be foreseen, within the protective ambit as claimed.

What is claimed is:

1. Automatic machine to load and unload films in radiography cassettes of differing formats, comprising:
   a first operation station in which inserting means operate to insert the radiography cassettes, one at a time, in the machine and to expel the reloaded radiography cassette therefrom;
   a second operation station, arranged subsequent to the first station, having at least one conveying means and at least one pushing means, in operation for carrying the incoming radiography cassette to contact at least one striker element, with associated detecting means for detecting the radiography cassette format; an opening means for opening the radiography cassette, arranged alongside and above said conveying means, and withdrawing means for withdrawing from the opened radiography cassette the film contained therein and for transferring the film to transfer means for transferring the film to a developing apparatus;
   a third operation station, containing said transfer means; and
   a fourth operation station containing a magazine for containing different film formats to reload the radiography cassette inserted in the machine,
   wherein said fourth operation station is arranged alongside said second operation station, said magazine being arranged alongside said conveying means opposite to the side along which said opening means is arranged, said magazine being composed of a number of substantially identical film-holding cassettes, arranged at different levels, vertically displaced from one another, each resting on an associated carriage means which slides reciprocally in the direction of the second operation station;
   a supporting plate for a number of frames for said carriage means for said number of film-holding cassettes, said supporting plate mounted for sliding vertically on slides fixed to a frame of the machine for vertically moving said frames supported thereby, said number of frames substantially equalling the number of film-holding cassettes;
   said supporting plate being equipped with a stylus element located on a line joining a plurality of actuators of a series of level signalling microswitches, vertically displaced from one another and interspaced at distances substantially equal to those between the levels at which said film-holding cassettes rest on the associated carriage means therefor,
   said microswitches being connected along with the means for detecting the cassette format inserted in the machine, in a feed circuit of a geared motor through which upward and downward movement of said supporting plate and therefore of the whole magazine is obtained, to stop the vertical movement of the magazine when said stylus reaches a position of the level signalling microswitch relating to a specific film-holding cassette containing the films of suitable format to that detected in the radiography cassette, for positioning said specific film-holding cassette in correspondence with a second withdrawing means to withdraw a film therefrom and to transfer the withdrawn film into said radiography cassette, said second withdrawing means arranged alongside said conveying means and operating above the same conveying means.

2. Automatic machine according to claim 1, characterized by the fact that the associated carriage means on which the film-holding cassettes forming the magazine rest are equipped with side coupling elements, engaged, in said smooth-running way, with a vertical slide arranged alongside the magazine and interrupted in an intermediate part at a height corresponding to that in which said second withdrawing means is arranged, a means being present in said interruption area which is engaged in the coupling element of the specific associated carriage means carrying the specific film-holding cassette, carried to correspond to the second withdrawing means, said means, with said magazine at a standstill, being mobile, in the direction of the second operation station so that it draws the specific carriage means into movement from a completely rear position, with the relevant film-holding cassette resting thereon in a closed condition, to a position where it brings said cassette, in an open condition, below said second withdrawing means, and thereafter once again to its initial position.

3. Automatic machine, according to claims 1 or 2, wherein the film-holding cassettes forming the magazine are of a type closed on top by a sliding cover, characterized by frames for the carriages on which the film-holding cassettes rest each composed of an arm projecting above said film-holding cassettes and a slit in which a projection presented by the covers closing the film-holding cassettes themselves are engaged, and said projection-slit.

4. Automatic machine, according to claim 1, characterized by the fact that the second withdrawing means comprises a series of suction devices supported by a cross member stretching out in front of the magazine, and interspaced to act on films of different formats, said cross member being articulated to a frame associated with a carriage moving alternatively in the direction of and inside the second operation station above the conveying means which conveys the radiography cassette from a position where said suction devices are arranged above said film-holding cassettes when opened to a position in which said suction devices are above the radiography cassettes and therefore once again in an initial position.

5. Automatic machine according to claim 4, characterized by the fact that said frame is associated with the carriage by means of a sliding block which slides within slides fixed to the same carriage, said sliding block being engaged in a pair of slides arranged above said carriage, the first moving on a vertical plane, arranged in correspondence with a starting position of said carriage, and the second, fixed, stretching towards and inside the second operation station, shaped to gradually approach the conveying surfaces of the device conveying the radiography cassette in upward direction, commencing from the height of the first slide in raised position, the first of said slides permitting the suction devices to descend to a position in contact with, and to take up, a first film in a package contained in said film-holding cassette opened and arranged above them and then their return to the starting position, and the second of said slides permitting, during an outward run of the carriage, a gradual descent of the suction devices, and therefore of the film withdrawn, towards the radiography cassette, until it leaves said film resting inside said cassette.

6. Automatic machine according to claim 5, characterized by the fact that said cross member, which supports the suction devices, is subject to the action of a small pneumatic piston associated with the sliding block which slides within the slides fixed to said carriage, its shank being connected to a lever arm integral to said cross member, said small piston comprising means for causing, with the suction devices in a position where they adhere to and take said film from the open film-holding cassette, a brief rotation of said cross member around points articulating it to the supporting frame so that it brings said suction device to an inclined position, lifting the front edge of the actual film from the underlying package of films contained in the film-holding cassette concerned.

7. Automatic machine according to claims 4, 5 or 6, characterized by the fact that a stylus device is provided associated with the suction devices arranged at the same height as suction openings of these devices, to detect the absence of films in a film-holding cassette of the magazine carried, open, below the same suction devices.

8. Automatic machine according to claims 4, 5, or 6 characterized by the fact that a series of blower nozzles are provided supported by a bar arranged to correspond to the suction devices, operable only when a film withdrawn from a film-holding cassette in the magazine is deposited by the suction devices inside the radiography cassette to facilitate the detachment of said film from the same suction devices.

9. Automatic machine according to claim 1, characterized by the fact that a detecting means is provided to detect the number of films exceeding one withdrawn each time by the second withdrawing means, said detecting means being arranged along the trajectory followed by said second withdrawing means during the transfer phase of the films from said film-holding cassette to the radiography cassette.

10. Automatic machine according to claim 1, characterized by the fact that said opening means is provided to open radiography cassettes of a type equipped with a closing cover hinged thereto on one side, said opening means comprising: an arm arranged to stretch out above the conveying means for the radiography cassette and the same cassette at a standstill in the second operation station, said arm being articulated to the machine frame for rotating reciprocally around a parallel axis in the movement direction of the conveying means to move from a position in which said arm stretches out above said cassette to that where it is in a substantially vertical position and then once again in the initial position; at least one rod which supports a double series of parallel coupling elements for coupling an opening pin of the cover of said cassette, arranged consecutively, and interspaced in relation to the format of the radiography cassettes provided for insertion in the machine, said rod being supported by said arm so that it slides reciprocally, longitudinally thereto, also being subject to the action of elastic means for biasing said rod against sliding surfaces of a curved slide arranged to correspond to the rear end of said arm and primed to the machine frame, with the possibility of rotating reciprocally around a parallel axis to the rotation axis of said arm.

11. Automatic machine according to claim 10, characterized by the fact that said curved slide is mobile, from a position where its curve centre is eccentric with respect to the rotation axis of the arm to which the rod is associated, which supports said coupling elements, to a position where its curve centre coincides with the rotation axis of said arm, in said position causing said axis, and therefore the coupling elements, to slide forward with respect to said arm, until the coupling elements, located in a position to move the trigger opening the cover of the radiography cassette in the machine, is brought to a position where it engages a trigger and opens said cassette, said curved slide remaining at a standstill in said position during the alternate rotation phases of said arm, respectively corresponding to the lifting and lowering of the cover closing the cassette.

12. Automatic machine according to the claim 10 wherein said pushing means which makes the radiography cassette contact a striker element, is arranged alongside said conveying means on the opposite side from the one in which the opening means operates, characterized by the fact that said pushing means is equipped with at least one probe located therein and arranged for insertion below the cover closing the cassette in the initial opening phase, for detaching from said cover the film contained in the cassette, accidentally adhering to same.

* * * * *